(12) United States Patent
Forno et al.

(10) Patent No.: US 6,744,517 B1
(45) Date of Patent: Jun. 1, 2004

(54) COMBINING INTERFERENCE FRINGE PATTERNS TO A MOIRE FRINGE PATTERN

(75) Inventors: Colin Forno, Ispra (IT); Maurice Whelan, Ispra (IT)

(73) Assignee: European Community Represented By Commision of the European Communities, Luxembourg (LU)

(*) Notice: Subject to any disclaimer, the term of this patent is extended or adjusted under 35 U.S.C. 154(b) by 0 days.

(21) Appl. No.: 09/719,215

(22) PCT Filed: Jan. 27, 2000

(86) PCT No.: PCT/GB00/00236
§ 371 (c)(1),
(2), (4) Date: Feb. 26, 2001

(87) PCT Pub. No.: WO00/49364
PCT Pub. Date: Aug. 24, 2000

(30) Foreign Application Priority Data

Feb. 17, 1999 (GB) .............................................. 9903638

(51) Int. Cl.$^7$ ................................................. G01B 9/02
(52) U.S. Cl. ...................................... 356/450; 356/35.5
(58) Field of Search ................................ 356/35.5, 450, 356/457

(56) References Cited

U.S. PATENT DOCUMENTS

| | | | | |
|---|---|---|---|---|
| 3,767,308 A | * | 10/1973 | Duffy | 356/496 |
| 3,825,346 A | * | 7/1974 | Rizzo | 356/28.5 |
| 4,981,360 A | | 1/1991 | Schwarz | 356/605 |
| 5,243,542 A | * | 9/1993 | Noguchi | 356/343 |
| 5,432,595 A | * | 7/1995 | Pechersky | 356/35.5 |
| 5,432,606 A | * | 7/1995 | Noguchi et al. | 356/514 |
| 5,436,462 A | * | 7/1995 | Hull-Allen | 250/550 |
| 5,459,578 A | * | 10/1995 | Park et al. | 356/618 |
| 5,481,356 A | * | 1/1996 | Pouet et al. | 356/35.5 |
| 5,557,408 A | | 9/1996 | Kanaya | 356/514 |
| 5,703,680 A | * | 12/1997 | Dunn et al. | 356/35.5 |
| 5,732,163 A | * | 3/1998 | Brandstetter et al. | 382/296 |
| 5,870,196 A | * | 2/1999 | Lulli et al. | 356/511 |

FOREIGN PATENT DOCUMENTS

GB 893669 1/1999

OTHER PUBLICATIONS

Eugene Hecht and Alfred Zajac. Optics (Reading, MA: Addison–Wesley, 1979), p. 286–294.*

"A new method for displaying indented and other markings on documents", C. Forno, *Science & Justice*, 35(1); 45–51, 1995.

Extract from Speckle Metrology, Ed. 12.5, Sirohi, Marcel Deker, Inc., New York, 1993.

"Video–rate Fringe analyzer based on phase–shifting electronic moire patterns", Jun–ichi Kato, et al., *Applied Optics*, pp. 8403–8406, vol. 36, No. 32, Nov. 10, 1997.

\* cited by examiner

*Primary Examiner*—Edward J. Glick
*Assistant Examiner*—Allen C. Ho
(74) *Attorney, Agent, or Firm*—Birch, Stewart, Kolasch & Birch, LLP

(57) ABSTRACT

An interferometer (1) is arranged to form a first interference fringe pattern comprising at least ten interference fringes; recording an image of said first interference fringe pattern; perturbing an optical path in the interferometer (1) to form a second interference fringe pattern comprising at least ten interference fringes; and combining an image of said second interference fringe pattern with the recorded image of the first interference fringe pattern to produce a further image comprising a moiré fringe pattern arising from a difference or differences between the first and second interference fringe patterns. The combining step involves subtraction (4) of digital images. Different wavelengths and interferometers are used: Michelson, Mach-Zehnder, Fizeau, Twyman-Green. In this new approach, all the errors of a poor quality, misaligned system are accepted and then eliminated by the combination process, producing a moiré fringe pattern. The method enables very large aperture optical systems for traditional and engineering interferometers to be constructed from inexpensive and basic components.

33 Claims, 11 Drawing Sheets

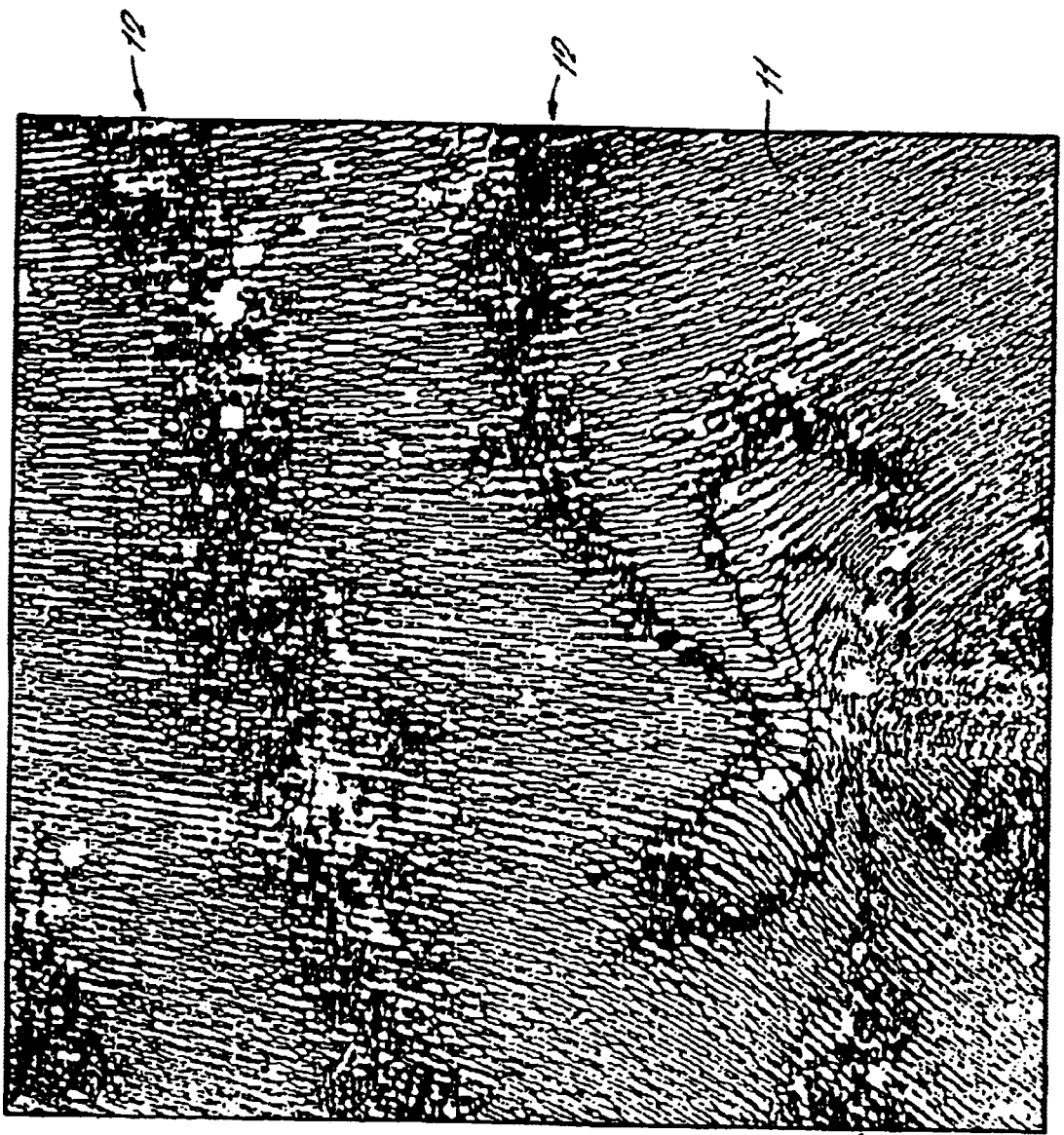

COMBINING INTERFERENCE FRINGE PATTERNS TO A MOIRE FRINGE PATTERN

This application is the national phase under 35 U.S.C. § 371 of PCT International Application No. PCT/GB00/00236 which has an International filing date of Jan. 27, 2000, which designated the United States of America.

The present invention relates to a measurement method arid measurement apparatus employing an interferometer arranged to form patterns of interference fringes.

Interferometers are well-known, and the testing and measurement of: optical components, from simple spectacle lenses to astronomical telescopes requires an interferometer system of one sort or another. Interferometers are also now routinely applied in engineering for the measurement of mechanical and thermal behaviour of materials and components.

Conventionally, for the most accurate measurement these interferometer systems are constructed from high-quality optical elements and include fine controls for precise alignment. The need for high quality, precise components makes interferometer systems expensive and places practical restrictions on the aperture of the instrument. Typically, the controls are adjusted to reduce the number of interference fringes formed in the observer's field of view before the test or measurement is performed to a minimum, and ideally zero. Then, an object to be tested is inserted in one arm of the interferometer, or the interferometer is perturbed (altered) in some other way. If the interferometer was initially set up to produce a fringe-free field, then all interference fringes appearing in the test interferogram are due to the perturbation.

In conventional interferometer measurement applications, a few fringes in the initial (i.e. reference) interferogram may be tolerated, if the test/measurement perturbation results in an interference pattern having a large number of fringes. The underlying imperfections in the unperturbed interferometer may be ignored.

If, however, the test/measurement perturbation itself only introduces a small number of fringes, then the underlying imperfections cannot simply be ignored.

Techniques are known for removing the effects of aberrations in the reference interferogram so as to display an image from a test component which is free from spurious fringes generated by an imperfect optical system. The method for applying the correction is, however, both elaborate and slow. From one or more interferograms of the reference and test object he phase distributions are calculated. The method typically necessitates the conversion of at least three test interference fringe patterns (interferograms) and at least three reference interferograms into digital images to facilitate processing. The three or more reference and test interferograms are phase stepped (shifted) from each other by pre-determined amounts. These phase shifted patterns are generated sequentially by the appropriate phase shifting of fringes, for example by a piezoelectric transducer-(PZT)-driven mirror or wavelength modulation.

Once the phase distributions (phase maps) have been calculated an unwrapping procedure is then applied to the phase maps. As the test phase maps also contain the reference phase information, subtraction of the reference map from the test map results in the presentation of the test information only. As a consequence or the delay, the subtraction is usually performed off-line and post-operatively. In addition, the approach may fail because the phase calculation and unwrapping procedures will not tolerate interferograms with excessive numbers of closely spaced fringes or fringes which are contorted.

It is also known to derive an accurate phase map of the optical path perturbation resulting from a test component by deliberately introducing carrier fringes (a spatial carrier) into the test interferogram by, for example, tilting a mirror in the interferometer, and performing a Fourier transform analysis method. Rather than requiring a least three reference interferograms, with the Fourier transform method only one fringe pattern having a spatial carrier is enough for the analysis. However, it requires more computation for Fourier transformation and filtering and cannot be conducted in real-time. Therefore it has not been easy to accelerate fringe analysis for quick applications such as feedback control of optical instruments and real-time monitoring of dynamic phenomena.

The paper "Video-rate fringe analyzer based on phase-shifting electronic moiré patterns", Kato et al, Applied Optics, Nov. 10, 1997, Vol. 36, No. 32, p8403—describes a fringe analyzer that delivers the phase distribution at a video-rate from a fringe pattern containing a spatial carrier. It is based on parallel generations of three phase-shifted moiré patterns through electronic multiplication with computer-generated reference gratings and low-pass filtering. The phase distribution is derived by the subsequent parallel processing of these patterns on the basis of a three-step phase-shifting algorithm.

Image processing involving digital subtraction of images is known in digital speckle pattern interferometry (described, for example, in "Speckle Metrology", Ed. R. S. Sirohi, Marcel Deker, Inc. New York, 1993, p125) and in document analysis (described, for example, in "A new method for displaying indented and other markings on documents", C. Forno, Science and Justice 1995, 35 (1) 45–51), and in "More technique by means of digital image processing", K. J. Gasvick, Applied Optics 1983, 22 (23) 3543–8.

Moiré fringe generation is a known process whereby the intensity distributions of two dissimilar grid patterns are combined, for example by superimposition, as described in Chapter 6, "Handbook of Experimental Mechanics", Society for Experimental Mechanics Inc, Prentice Hall, Englewood Cliffs, N.J. 07632, USA 1987, ISBN:0-3-377706-5. By superimposing the dissimilar grids, a moiré fringe pattern is generated which represents the local differences between the spatial frequencies of the grids.

According to a first aspect of the present invention, there is provided a measurement method comprising the steps of:
  arranging an interferometer to form a first interference fringe pattern comprising at least ten interference fringes;
  recording an image of said first interference fringe pattern;
  perturbing an optical path in the interferometer to form a second interference fringe pattern comprising at least ten interference fringes; and
  combining an image of said second interference fringe pattern with the recorded image of the first interference fringe pattern to produce a further image comprising a moiré fringe pattern arising from a difference or differences between the first and second interference fringe patterns.

Thus, it is no longer necessary to align the interferometer with great precision to produce a substantially fringe free reference (i.e. first) interference fringe pattern before the test or measurement is performed (i.e. before the interferometer is perturbed/altered).

The moiré fringe pattern produced by combining the first and second interference fringe patterns is determined by the perturbation itself, and not by the underlying Imperfections and misalignments of the unperturbed interferometer.

In this new approach, all the errors of a poor quality, misaligned system are accepted and then eliminated by the combination process, producing a moiré fringe pattern. The method enables very large aperture optical systems for traditional and engineering interferometers to be constructed from inexpensive and basic components.

A conventional high quality optical measurement interferometer will typically comprise optical components having surfaces manufactured to tolerances of better than $\lambda/10$ or even $\lambda/100$ where $\lambda$ is the wavelength of light input to the interferometer.

With the inventive method, imperfections in optical components as large as $100\lambda$ or greater may be tolerated.

The interferometer used in the present invention may be an optical interferometer, or alternatively may be an interferometer arranged to form an interference pattern from incident electromagnetic radiation having different wavelength.

In a basic form, the method may be implemented by recording the first image on, for example, a photographic film. The subsequent interference fringe pattern, produced by perturbing the interferometer system, may then be projected onto the recorded image and the resultant moiré fringe pattern observed.

Alternatively, the recorded image may be captured by a camera, such as a high resolution electronic camera where the image of the interference pattern is focussed onto a CCD (Charge Coupled Device) sensing element.

The images combined to produce the moiré fringe pattern may be digital images, facilitating the processing and enabling a variety of combination procedures to be employed, for example subtraction, multiplication, addition, and/or superimposition.

Thus, the combining step may comprise one or more of the steps of adding, subtracting, filtering, superimposing, or multiplying the images.

Advantageously the images of the first and second interference fringe patterns may be combined by a process of digital subtraction.

In order to produce moiré fringe patterns, each of the first and second interference fringe patterns clearly needs to comprise a number of fringes. Ten is a practical lower limit, but better (i.e. more detailed) moiré fringe patterns may be obtained by increasing the number of fringes in the first and second patterns.

Advantageously, the method may therefore include the step of tilting a reflecting surface of the interferometer to increase the number of interference fringes.

If the components of the interferometer are sufficiently irregular, or the alignment is already sufficiently poor, however, then no further adjustment may be needed to provide an interference fringe pattern comprising a large number of fringes.

Advantageously, the first interference fringe pattern may comprise at least fifty, and preferably at least 100 fringes.

Preferably, the spatial frequency of the fringes in the first (reference) interference pattern should be higher than the spatial frequency of fringes that would be introduced by the measurement/test perturbation, were the interferometer set up to produce an initial fringe-free field, i.e. the carrier fringe spatial frequency should be higher than the spatial frequency of the phase distribution to be measured.

The number of fringes in the first interference fringe pattern may be larger than, smaller-than, or the same as the number in the second pattern.

The perturbation may result in the second interference fringe pattern having fewer fringes than the first pattern, but ideally the interferometer should be arranged so that the number of fringes in the interference fringe pattern produced by the interferometer is increased by the perturbation, i.e. the second pattern comprises more fringes than the first. For example, a detailed moiré fringe pattern may be produced by combining a first image of 100 fringes with a second image of 150 fringes.

The perturbation to the interferometer system may take a number of forms. For example, the step of perturbing may comprise the step or inserting a transparent test object in the optical path (e.g. inserting the object in one arm of the interferometer).

The step of perturbing may comprise the distortion, rotation, and/or translation of a reflecting surface or a transparent object in the optical path.

The step of perturbing may comprise the step of replacing a reference object with a test object, and the first interference fringe pattern may have been recorded with the reference object in place.

The step of perturbing may alternatively, or in addition, comprise the step of disturbing a gas and/or disturbing the flow of a gas in the optical path.

The image of the second interference fringe pattern may also be a recorded image, or alternatively may be a live image output by a camera.

Advantageously one or both of the recorded image of the first interference fringe pattern and the image of the second interference fringe pattern may be images selected from a recorded sequence of images of the interference fringe pattern formed by the interferometer.

Advantageously the recorded image of the first interference fringe pattern and the image of the second interference fringe pattern may be digital images.

Preferably, the step of combining includes the step of subtracting one of the digital images from the other. Advantageously, with modern image processing software, the subtraction computation is trivial and can be performed, and the result (the further image) displayed almost continuously in real time.

Thus, by applying the principles of moiré in digital form to interferometry, optical aberrations can be made inconspicuous and apart from the time required to perform a simple image subtraction between reference and object images, there are no other delays in presenting the corrected interferogram. In addition, the method can better accommodate gross aberrations, thus offering the opportunity of constructing systems from inexpensive components of poor optical quality. There is no need to align the interferometer precisely and so an economy can be made on the quality of the mechanical adjustments. Advantageously, the step of combining may include the step of converting negative values obtained in the subtraction process to positive values. Thus, the image resulting from the subtraction may be rectified, which provides the advantage that the frequency of the rectified pattern is double that of the carrier (i.e. the spatial frequency of the first interference fringe pattern). This property improves the discrimination of the moiré fringe pattern over the carrier compared with alternative processing techniques, such as addition where the carrier frequency is preserved. The further image will, of course, in general include the moiré fringe pattern and a finer pattern at, or close to, the carrier frequency.

The method may further comprise the steps of arranging the interferometer to form a third interference fringe pattern;

recording an image of the third interference fringe pattern;

arranging the interferometer to form a fourth interference fringe pattern;

recording an image of the fourth interference fringe pattern, wherein the first, third and fourth interference fringe patterns are phase shifted from each other by predetermined amounts; and combining the image of the second interference fringe pattern with each of the recorded images of the first, third and fourth interference fringe patterns to produce respective said further images; and processing the further images to produce a phase map of the perturbation of the optical path.

Thus, at least three phase-stepped "reference" interferograms may be generated and recorded, and combined with the second interference fringe pattern, i.e. the test interferogram, to produce respective further images.

The phase shifting or stepping may be achieved by conventional means (for example the use of piezoelectric transducer-driven mirrors).

Advantageously, the image of the second (test) interference fringe pattern may be an image selected from a recorded sequence of images of the interference pattern formed by the interferometer.

Thus, the changing interference pattern during a test may be recorded in real time, and then analysed at a later time by processing with the at least three phase stepped reference images to produce a full phase map of the perturbation at any given time in the measurement process.

Advantageously, the images of both the first and second patterns may be images selected from a recorded sequence of images of the interference pattern formed by the interferometer. Thus, the resultant moiré fringe pattern in the further image is indicative of only the changes in the interferometer arrangement between the two selected times.

Any two images (i.e. interferograms) may be selected from a recorded sequence and combined (e.g. digitally processed) to produce a resultant image comprising a moiré fringe pattern indicative of the change to the interferometer between the times at which the selected images were recorded.

Images of the interference fringe patterns formed by the interferometer may be captured and output as a continuous stream or sequence from an electronic camera. Each image may be combined with the stored first image to produce a respective further image and respective moiré fringe pattern which may be displayed in real time, e.g. at video rate.

According to a second aspect of the present invention there is provided measurement apparatus comprising:

an interferometer arranged to form interference fringe patterns comprising at least ten interference fringes;

a camera arranged to capture images of the interference fringe patterns;

an image store arranged to store an image of the interference fringe pattern captured by the camera at a selected time;

an image processor arranged to combine the stored image with an image of the interference fringe pattern captured by the camera at a different time to produce a further image comprising a moiré fringe pattern arising from a difference or differences between the interference fringe patterns at the selected and said different time.

The interferometer may, for example, be a Michelson interferometer, a Mach-Zehnder interferometer (as shown in FIG. 10) or may be based on an adapted "Schlieren" optical arrangement.

The interferometer may be arranged to form interference fringe patterns comprising at least fifty interference fringes, and the images may be digital images.

The image processor may be arranged to produce the further image by a process including at least the subtraction of one of the digital images from the other.

Additional processing may be performed on the images, such as filtering or normalisation of intensity distributions. This further processing may be performed on the images before, during, or after their combination to produce the further image including a moiré fringe pattern.

The further image or images may also be processed, for example by filtering to remove the underlying carrier fringe pattern and so leave only the moiré fringe pattern.

The image processor may be arranged to produce the further image by a process including the conversion of negative values obtained in the subtraction process to positive values, i.e. the processor may be arranged to rectify the intensity distribution calculated by subtraction.

The interferometer may include means for phase shifting the interference fringe patterns by predetermined amounts, the image store may be arranged to store images of the interference fringe patterns captured by the camera at at least three different selected times, the image processor may be arranged to combine each stored image with the image captured at a different time to produce a respective further image comprising a respective moiré fringe pattern, and the image processor may be further arranged to process the further images to produce a phase map. This phase map may be indicative of the perturbation to the interferometer between the different time and the time of capture of one of the stored images.

The camera may be arranged to output a continuous sequence of captured images of the interference fringe pattern, and the image processor may be arranged to combine the or one of the stored images with each one of the sequence of captured images and to produce a respective further image, which may be stored. The apparatus may further comprise a display for displaying the sequence of further images, and each further image may be displayed substantially as soon as it is produced. The sequence of further images may be displayed and/or stored at the same rate as the capture of images by the camera.

The measurement apparatus may further comprise an image recorder for recording the images captured by the camera, and an image selector for selecting one of the recorded images to be used as the stored image or the image to be combined with the stored image. Alternatively, both images may have been selected from a sequence of recorded images.

The camera may be a CCD camera to provide high resolution and fast response.

Advantageously, the interferometer may have an aperture of at least 10 cm. The aperture may be as large as 1 m, or larger still, as the further image production process inherently rejects the underlying imperfections in the interferometer components.

The advantage of subtracting one image from another (i.e. subtracting one intensity distribution from another) is that wherever the images are the same (the intensities are the same) the resultant image will show a dark region.

Generally, increasing the number of fringes in the first interference fringe pattern (i.e. the reference interferogram) increases the detail on the resultant moiré fringe pattern and improves the resolution of the perturbation to the interferometer. However, an upper limit to the density of the fringes (i.e. the maximum spatial frequency of the fringes in the recorded image of either the first interference fringe pattern or the second (test) pattern) is set by the resolution of the means used to record the image, for example the resolution or pixel density of the camera used to capture the image and the capacity of the image snore used to hold the recorded image.

Embodiments of the present invention will now be described with reference to the accompanying drawings in which:

FIG. 3a is a digitally subtracted moiré interferogram of gas emerging from a butane lighter obtained using apparatus similar to the embodiment shown in FIG. 1;

A method in accordance with a preferred embodiment of the present invention includes a process which shall be referred to as Digital moiré subtraction (DMS). The interferometer is configured with a means of introducing carrier, or tilt fringes in the interferogram, with the number of fringes across the field variable, but within the resolution of the image camera and frame store. This can usually be accomplished by manual adjustment of a mirror. The image is captured, digitally stored and used as a reference. Subsequently the reference image is then subtracted from the acquired images and the difference displayed.

Both reference and all subsequent images consist of fine, quasi-regular fringe patterns, which are equally distorted by the combined optical aberrations of all the interferometer components. If the patterns are identical when the two digitised intensity distributions are subtracted the result is a dark, fringe-free field. If one image is modified by changes in the optical path length of one arm of the interferometer, caused by formation of a test component, perturbations or other optical effects, fringes are generated which represent the changes only. Detailed analysis of the fringe pattern can be carried out directly on the moiré interferogram, for example by phase stepping, phase unwrapping and differentiation. One important feature of this analysis is that it operates or a single interferogram of the test field.

In the process of subtracting the spatial carrier patterns of two interferograms with a small shift in phase between them, the resulting absolute values of intensity will oscillate about zero. When rectified the frequency of the pattern is double that of the carrier. This property improves the discrimination of the moiré fringe pattern over the carrier compared with alternative processing techniques, such as addition where the carrier frequency is preserved.

An on-line image subtraction facility is a standard feature of most image processing software. Since the subtraction computation is trivial, it can be performed and the result displayed almost continuously in real-time.

The DMS approach has been assessed on a number of optical systems with a view to demonstrating its potential. Applying embodiments of the inventive method to conventional Michelson interferometry (see e.g. Born M. and Wolf E., Principles of optics, Pergamon Press, Oxford, 6th ed., 300–302) and its derivatives, the advantage of using low-quality components and imprecise adjustment controls are clear. These benefits can be exploited in grating interferometry (see e.g. Post D., et. Al., High sensitivity moiré, experimental analysis for mechanics and materials, Springer Veriag, New York (1994) and, in addition there are other features which enhance the range of measurements.

Figure 1:
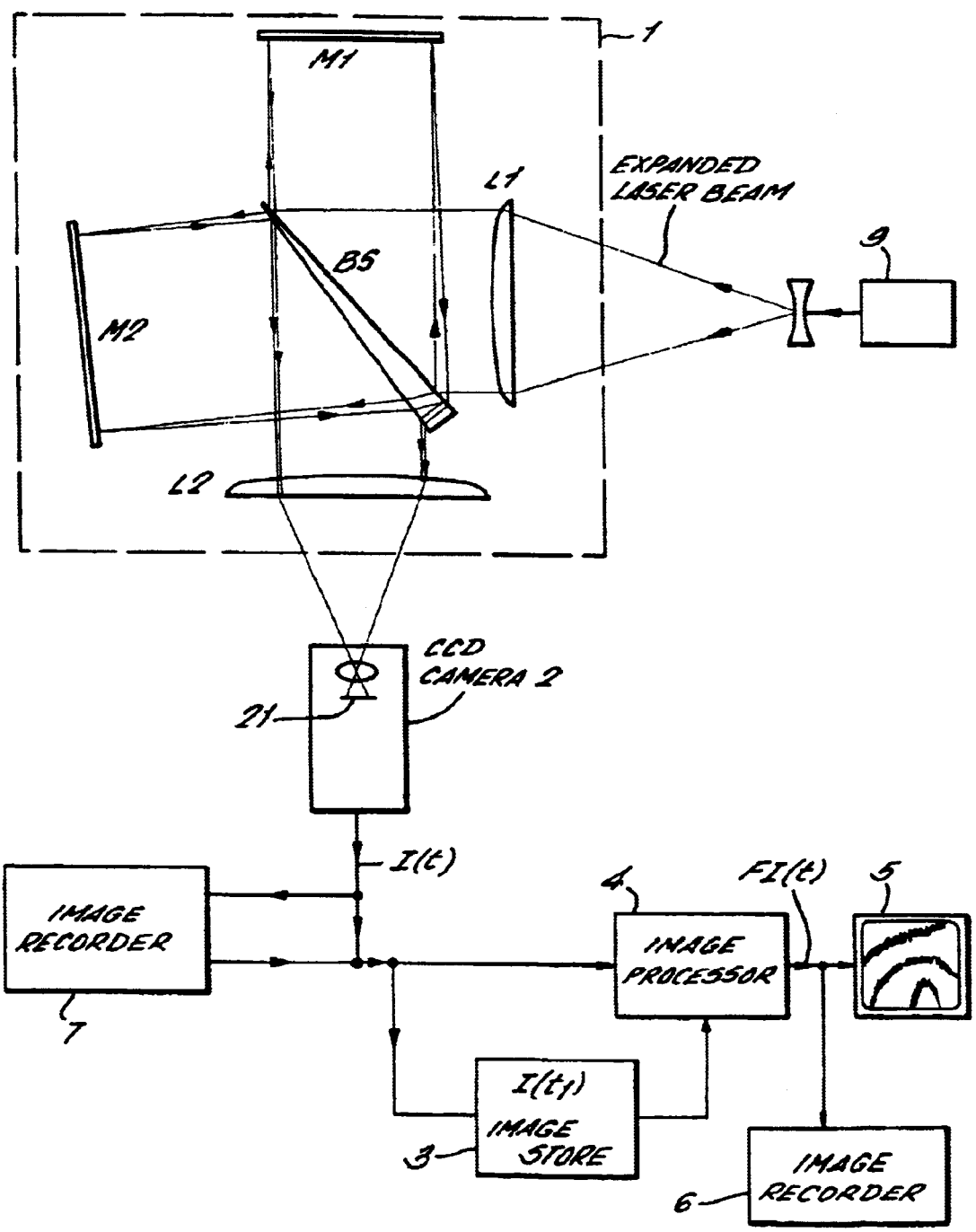
FIG. 1 is a schematic diagram of measurement apparatus in accordance with an embodiment of the present invention, incorporating a Michelson Interferometer.

Measurement apparatus in accordance with an embodiment of the present invention, incorporating a Michelson interferometer 1 is shown in schematic form in FIG. 1. With an aperture of 60 mm square, it comprises: 2 plano-convex borosilicate crown glass lenses (L1, L2), one semi-transparent beam splitter (BS) and 2 fully reflecting mirrors (M1, M2). The mirrors are front-surfaced, but coated on standard quality 2 mm float glass. The numerous self-fringes produced by front and rear surface reflections from the beam splitter have been eliminated by converting it into a small angle hollow prism, with a sheet of uncoated glass for the opposite window and with the prism filled with liquid paraffin.

Illumination is provided by a He—Ne laser, 9 fitted with a diverging objective at a distance approximating to the focal length of the interferometer collimating lens (L1). The second lens, at the exit of the system acts as a field lens for the CCD camera 2 used to capture and record the interferograms. The apparatus is arranged such that the patterns of the interference fringes produced by the interferometer 1 are focused onto the CCD sensing element 21 of the camera. The camera outputs a continuous stream of captured digital images I(t) and an image store 3 is arranged to record an image captured at a selected time. The apparatus includes an image recorder arranged to record the sequence of captured images, which can also play the images back to the image processor 4. The image processor 4 combines the stored image $I(t_1)$ with the live image or image retrieved from the recorder 7 to produce a further image Fl including a moiré fringe pattern. The further images are displayed on a display 5 in real time (at video rate) and/or may be recorded by the, or another, recorder 6. Briefly, the mechanism for generating interference fringes is by interference between the two reflected beams from M1 and M2, which are added by BS. Any perturbation of one beam resulting from the insertion of an optical component, or refractive index variation caused, for example, by convective flow, will disturb the wavefront of this beam and produce interference fringes.

Figure 2A:
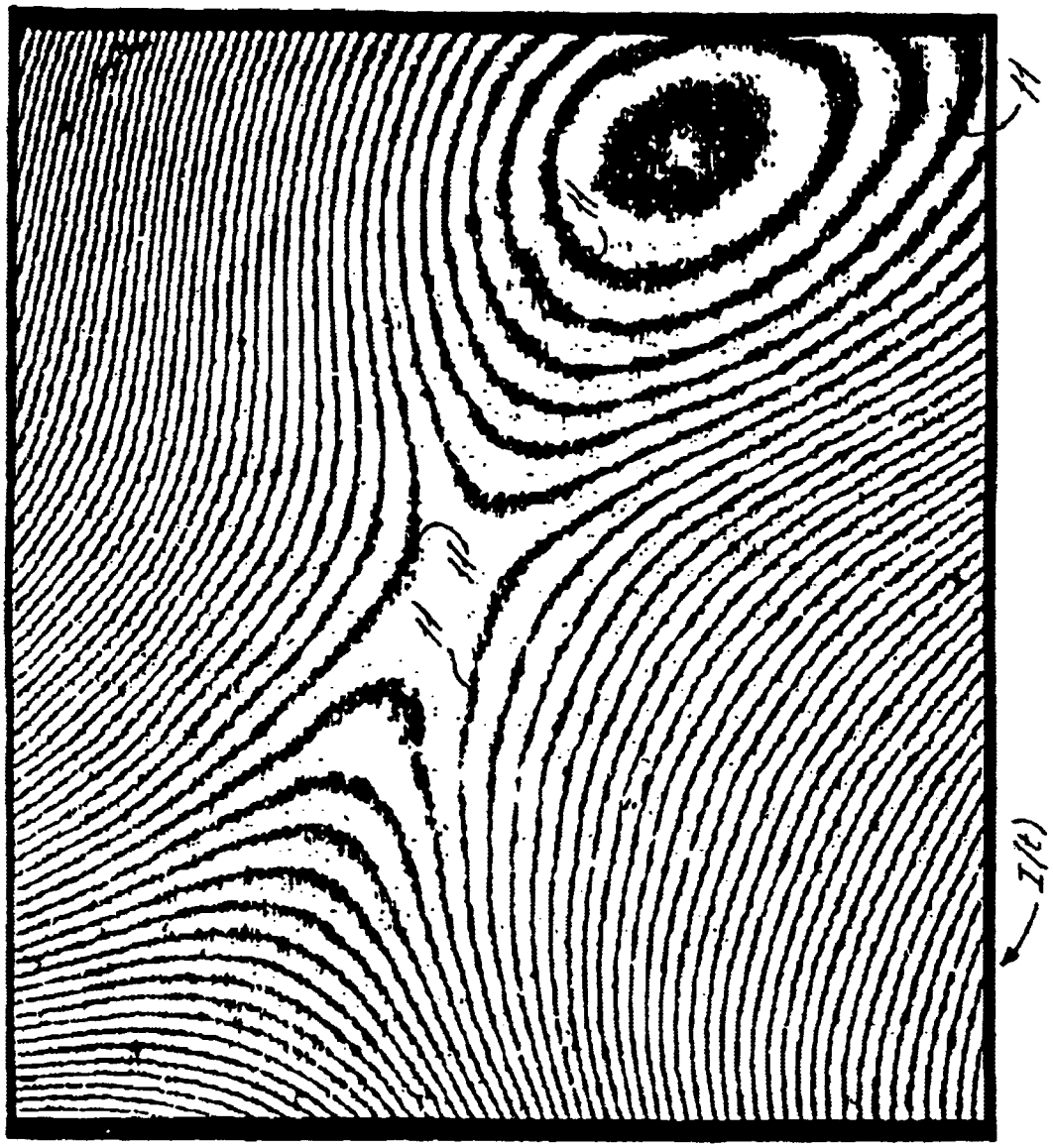
FIG. 2a is an image of an interference fringe pattern (interferogram) formed using the measurement apparatus of FIG. 1.

FIG. 2(a) shows the distribution of interference fringes 11 generated solely by the combined errors in the optical components of the interferometer. There are so many fringes present that it is not possible to optimise the alignment of the system. Moreover, the fringes are so closely spaced and contorted as to prevent the application of automatic fringe analysis methods. It would not be unreasonable to consider that an interferometer possessing such gross aberrations would be of little or no use as a measurement instrument.

A tilt was applied to one mirror in order to produce an even finer pattern, largely free from broadly spaced fringes. In a method embodying the present invention, this image is captured and then digitally subtracted from the live image. The optical errors in the interferometer are thus removed making it sensitive only to the errors of the introduced test component. As a test, by introducing an additional small tilt (i.e. a tilt in addition to the tilt applied to produce the even finer pattern) to one mirror the subtracted moiré interferogram of FIG. 2(b) was produced. Such straight and uniformly spaced moiré fringes 12 are normally expected only from an interferometer possessing a high degree of optical correction.

There is a slight curvature to the moiré fringes at the edges of the field which is due to the geometric distortion introduced by the CCD camera lens and L2. This can be compensated optically by choosing a lens combination that is better corrected, or mathematically by reference to a look-up table of the field distortion.

Figure 3B:
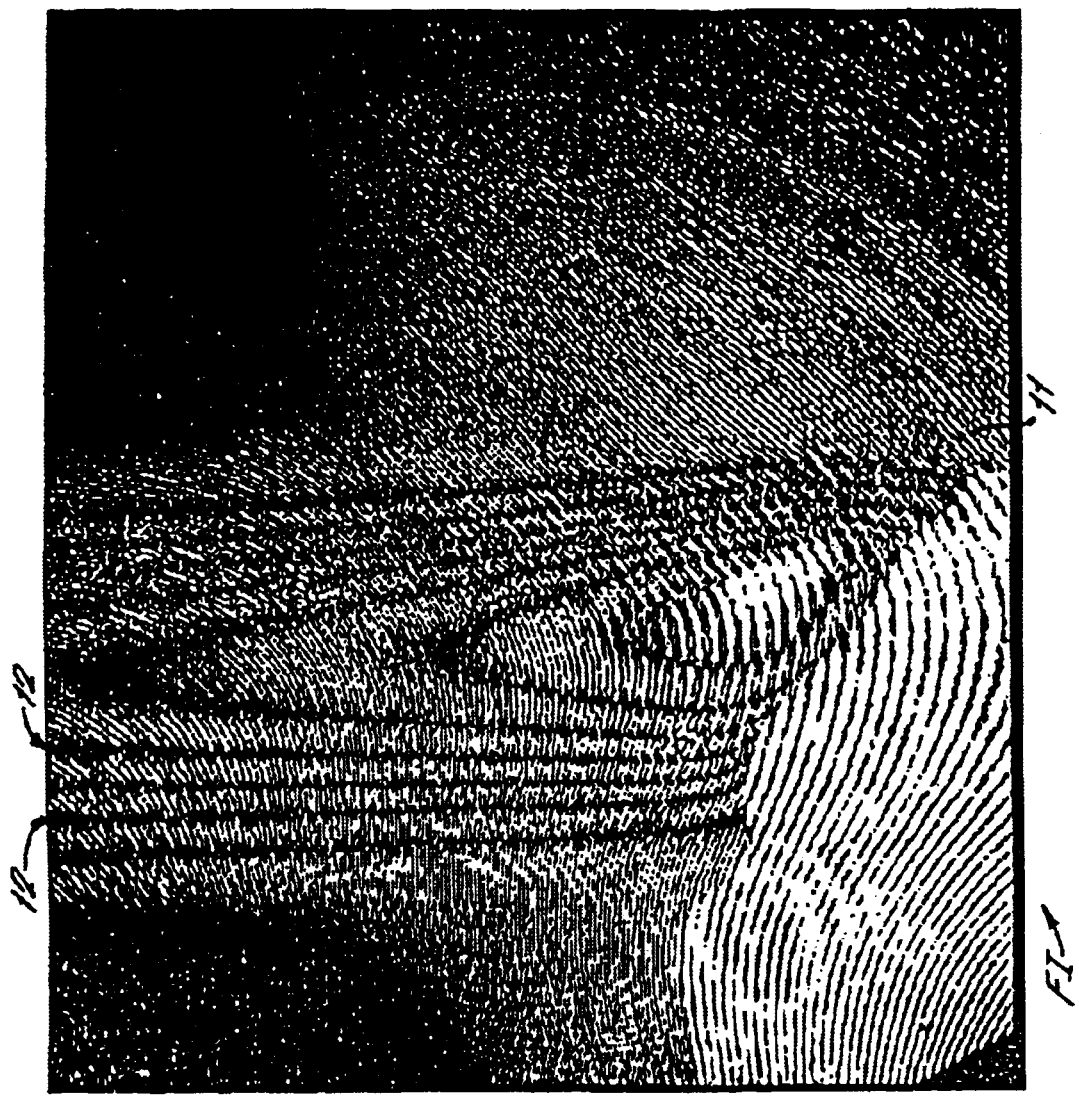
FIG. 3b is a digitally subtracted moiré interferogram of a gas flame, obtained using apparatus in accordance with the embodiment shown in FIG. 1.
Figure 10:
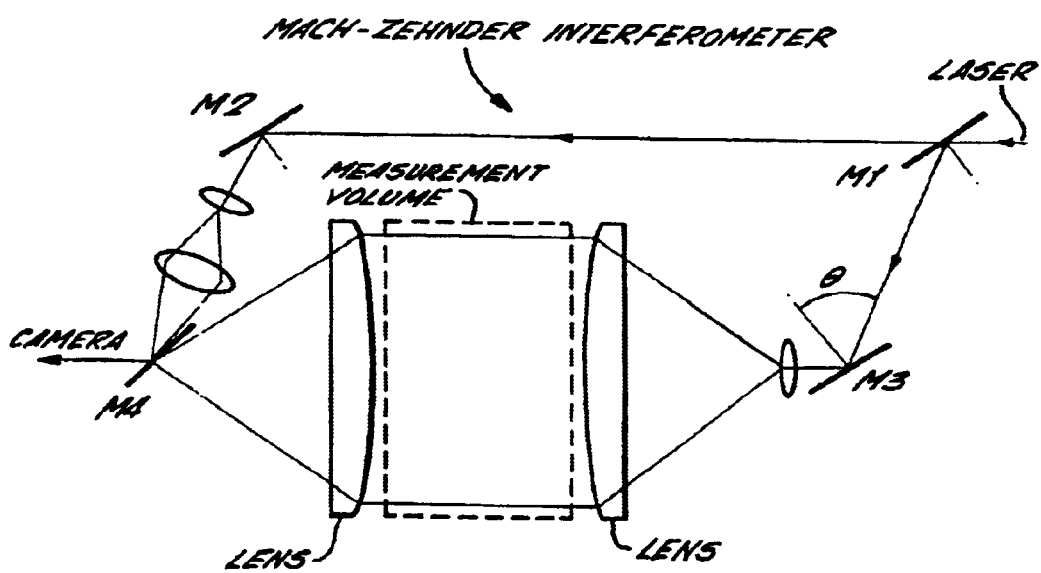
FIG. 10 is a schematic diagram of a Mach-Zehnder interferometer suitable for us in embodiments of the present invention.

FIG. 3(a) demonstrates an application of DMS to display the induced refractive index distribution of unlit gas emerging from a butane lighter and FIG. 3(b) the interferogram produced when the gas is ignited. Without digital moiré subtraction, the subtle influences of the gas and flame would have been inconspicuous when superimposed on the untreated interferogram. The inventive method may be used on a Mach-Zhehnder interferometer system (see e.g. Born M. and Wolf E., Principles of Optics, Pergamon Press, Oxford, 6th ed., 312–314) in the field of convective flow. An example of a Mach-Zehnder interferometer, to which the inventive method may be applied, is shown in FIG. 10.

Conventionally this interferometer has symmetric optical arms. With DMS, simple and fewer optical components can be used and the system can be made non-symmetric, with consequent advantages in compactness and less environmental disturbance effects to the reference beam.

The moiré interferograms of FIGS. 3(a) & 3(b) each comprise a pattern of moiré fringes 12 visible over the carrier interference fringes (at higher spatial frequency). The moiré fringes are not formed by the interferometer, but instead by the combination of direct interference fringe patterns formed by the interferometer 1.

Embodiments of the present invention are suitable for the measurement of optical flatness and lens aberrations.

The digital moiré approach has potential application in the design of large aperture interferometers. In a Fizeau system (see e.g. Born M. and Wolf E., Principles of Optics, Pergamon Press, Oxford, 6th ed., 280–291), for measuring optically flat surfaces, the main component is a stable, high quality reference flat from which a second surface can be compared. Providing the long-term stability of the optical arrangement is preserved, DMS offers a way of relaxing the tolerances on the surface figure of the flat as well as the auxiliary components, including the beam splitting element.

In an embodiment of the inventive method, a non-optimised Fizeau interferometer is initially calibrated using a master flat in the measurement position. Tilt fringes are introduced into the interferogram which is then captured and stored. Without further adjustment, the master is removed and replaced with the test component. The master flat image is subtracted and the result (i.e the further image comprising moiré fringes) represents height contours of the components surface.

In this way, there is no requirement to keep a high quality reference surface in the system, instead, the initial reference interferogram can be stored permanently. However, if there are doubts about the stability of the interferometer, then it may be advisable to refresh the master flat moiré interferogram by repeating the calibration from time to time. It is possible to envisage that a single master flat could be used as an International Standard in the setting up of individual local Fizeau systems.

For the measurement of lens aberrations, a Twyman-Green system (see e.g. Born P. and Wolf E., Principles of Optics, Pergamon Press, Oxford, 6th ed., 302–305) is appropriate. The symmetric and asymmetric aberration terms can be displayed in the resulting interferogram by respectively translating and rotating the lens in the interferometer.

A similar approach to the Fizeau method can be applied in lens testing, where the master fringe interferogram of a well-corrected lens is stored permanently and compared with the test lens.

Other optical systems, based on non-interferometric principles can be operated as interferometers using the DMS method. For example, in the examination of air flow and shock waves in wind tunnel systems the optical arrangement known as "Schlieren" is employed. This may be used in conjunction with laser illumination and DMS to provide the same measurements, but at a greater, interferometric sensitivity.

Embodiments of the inventive method are employed in moiré or grating interferometry.

Figure 7:
FIG. 7 shows an interference fringe pattern derived from a grating interferometer with a well-corrected collimating lens.

This sensitive and versatile in-plane deformation measurement technique is based in its simplest form on a mirror system which is illuminated with an expanded and collimated laser beam. A well-corrected, achromatic lens is usually employed in collimation because of its minimal spherical aberration and the consequent reduction in the number of initial reference fringes. In one system, containing an expensive, high quality collimating lens and a nominally perfect specimen grating, the residual fringe pattern represents a potential uncertainty, unless compensated, of 25 microstrain and in most applications this would be considered negligible and ignored. Such an "ideal" imperturbed interference fringe pattern is shown in FIG. 7.

To test the DMS approach on compensating for aberrations in grating interferometry, rather than dismantle the system and install inferior components, a defective optical element was introduced in to the system so as to effectively degrade the wavefront perfection. A simple method was to insert in front of the collimating lens the polycarbonate plastic lid of a CD box. These are visibly of poor optical quality and in conjunction with the collimator represented an optical component that would normally be rejected.

Figure 8:
FIG. 8 is an interference fringe pattern showing the effect of introducing a poor quality optical component into the grating interferometer used to produce the pattern of FIG. 7.

Using the identical mirror and specimen, but passing the illuminating beam through the lid the integrated aberrations introduced several wavelengths of error, equivalent to a strain on the specimen which exceeded 0.02%. The resultant interference fringe pattern is shown in FIG. 8.

Figure 2B:
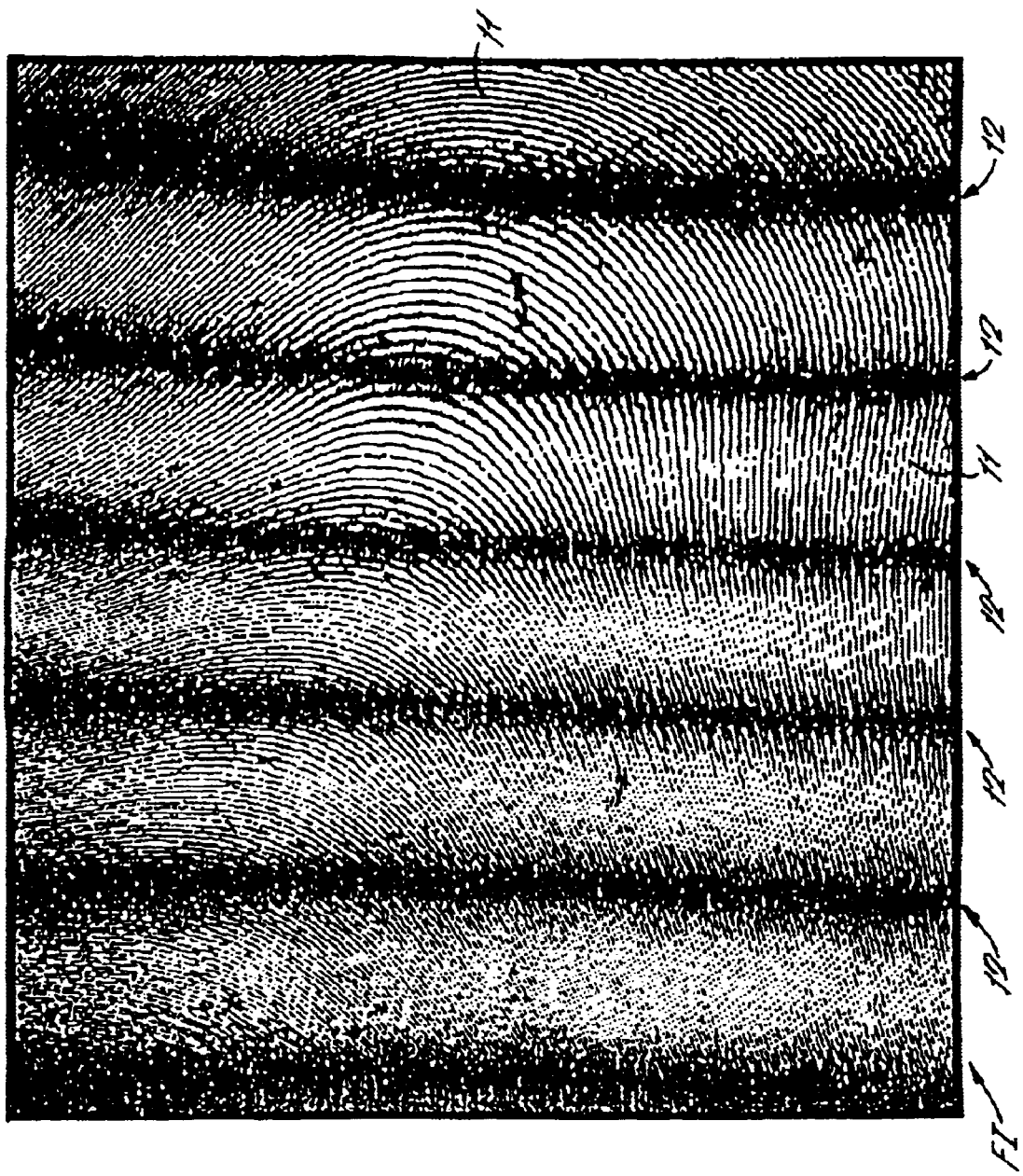
FIG. 2b is a representation of a further image obtained using the apparatus of FIG. 1, comprising a pattern of moiré fringes.

With the plastic lid still in position, applying DMS and introducing a simulated uniform load, a figure similar to FIG. 2(b) resulted. The uniformity of spacing and straightness of the fringes indicated again that the interferometer was well corrected and the uncertainty of measurement, of the order of ±0.1 of a wavelength, was equivalent to a few microstrain a virtually strain-free field.

Preferred embodiments of the present invention are used in the mechanical behaviour measurement of components.

In testing components that are subject to high levels of strain, hundreds of interference fringes may be generated and whose orientations vary greatly. This will present problems in applying successfully automatic fringe analysis by the traditional approach. With DMS, the test interferogram of the high strain condition can be stored as a new reference, i.e. a "snapshot" of the interference fringe pattern can be taken at a particular moment in time, for use as a reference image. The interferometer is then reset to a null fringe condition, so that subsequent changes in the level of strain will appear as individual moiré fringes, rather than a subtle variation to a complex pattern. This process has important implications in the enhanced detection of special events in testing, such as the initiation of cracking and the onset of plastic deformation.

Figure 9A:
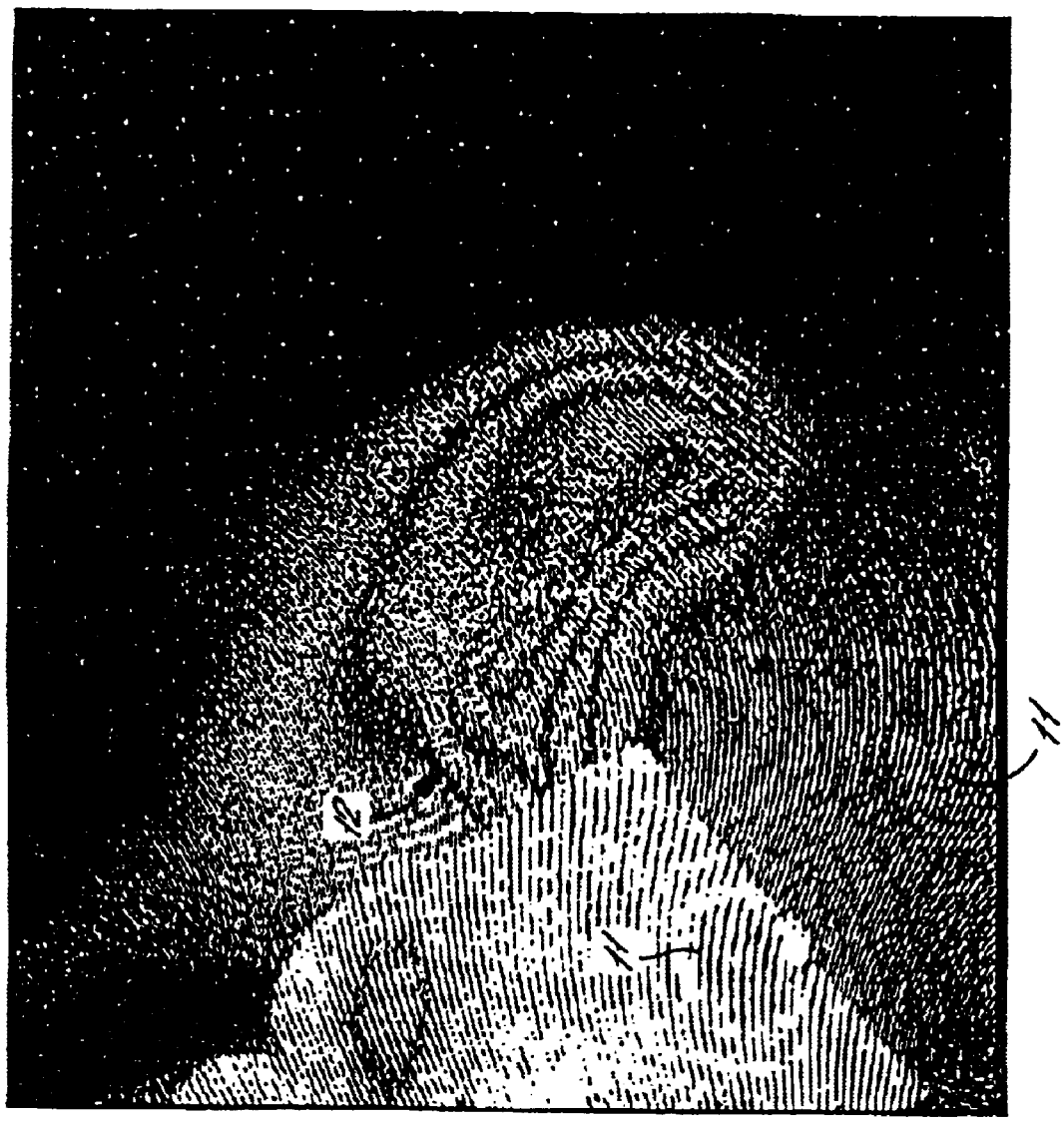
FIG. 9 is an x-strain contour map of a sheared and digitally subtracted grating interferometry image produced using a method in accordance with an embodiment of the present invention.

A feature of moiré techniques applied to in-plane displacement measurement is a method for displaying in-plane strain contours by shearing the image upon itself. In moiré interferometry this could be applied by performing a subtraction between two sheared interferograms, both at the same high strain state. The shear can be introduced digitally and with little delay, so that the potential for displaying strain contours in effectively real time is possible. FIG. 9 is an example of an x-strain contour map of an aluminium test specimen containing a crack. The contours show interference fringes 11 and moiré fringes 11, as discussed above. The strain intervals are approximately 0.05% strain.

In testing components which bear an imperfect surface pattern, due to errors in pitch or local orientation, the imperfections can be eliminated along with the other optical aberrations.

Figure 4:
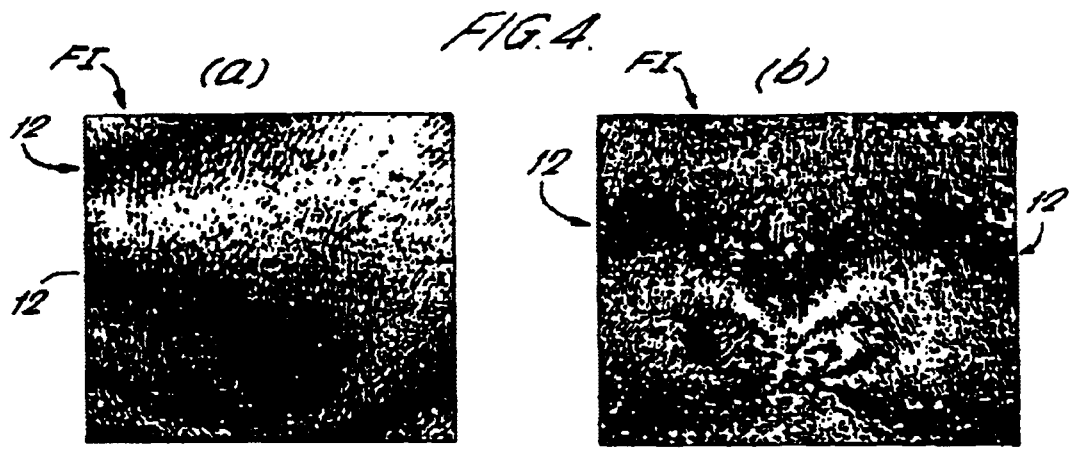
FIG. 4a is a DMS interferogram produced from grating interferometry applied to a notched specimen, with a small deformation added to a highly deformed state (one fringe= 0.42 microns x-displacement)
FIG. 4b is a sheared DMS image of the specimen in FIG. 4a, showing strain contours at approximately 0.05% intervals.

Other features, such as displaying a whole-field strain distribution in real-time have been successfully tested. FIG. 4, shows a DMS interferogram from grating interferometry applied to a notched specimen at a gross displacement state. An additional small deformation of distribution, of approximately 1 micron is revealed above a non-uniform deformation exceeding 50 microns.

The digital moiré interferograms may be analysed by a process including phase stepping.

Depending on the algorithm used, temporal phase stepping methods for the automatic analysis of fringe patterns required the capture of three or more interferograms in order to calculate the phase distribution across the image (see e.g. Creath. K, Phase measurement interferometry techniques, Progress in optics. ed. Wolf, E. Chapter 5, Elsevier Sceience, B. V. (1988). The process is usually performed on the test interferogram which has to be phase stepped by incrementally changing the path length in one arm of the interferometer. During stepping, it is usual to hold the component in a fixed condition.

Applying the process to the analysis of DMS images, the phase stepping process needs to be carried out only on the initial reference image. The resulting stepped interferograms are then subtracted in turn from a single test interferogram, yielding a set of optically corrected images from which the phase distribution can be computed. This useful feature of a single test image offers the opportunity of conducting measurement under dynamic conditions. In addition, by recording a complete test program on videotape, or by other means it is practical for the operator to choose a particular image for detailed analysis by this method.

Embodiments of the present invention also find application in large aperture interferometry.

Apart from the facility for ameliorating the effects of gross aberrations of the optical components, another advantageous feature of digital moiré subtracting is its potential in large aperture interferometry. In a preliminary study, an interferometer based on the Fizeau design was constructed from simple components.

Figure 5:
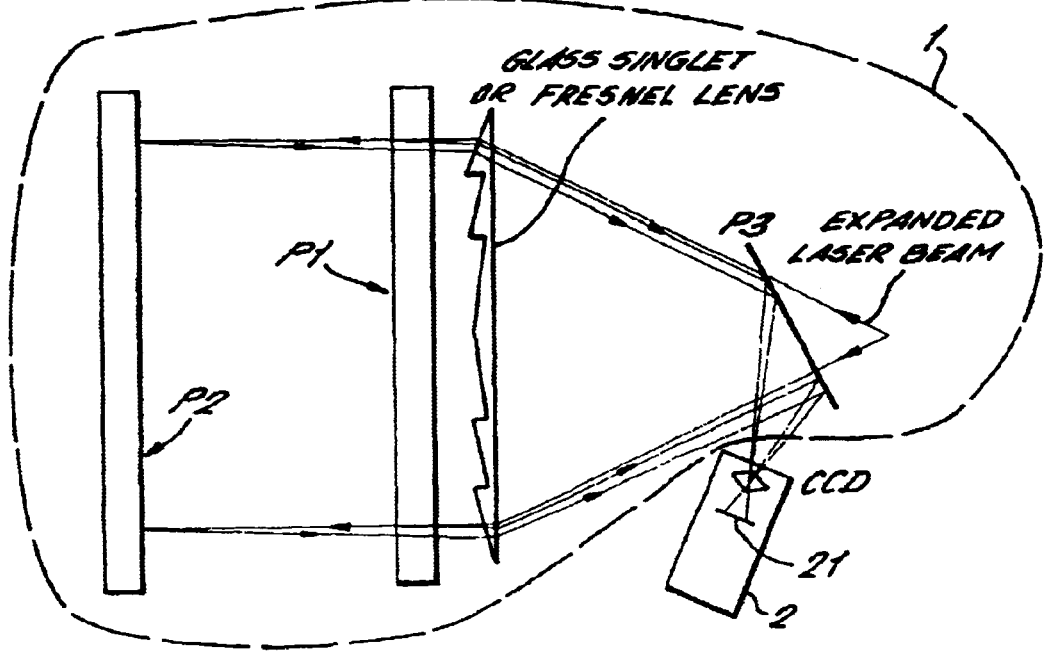
FIG. 5 is a schematic diagram of a large aperture interferometer using simple uncoated optical components, suitable for use with methods embodying the present invention.

FIG. 5 indicates that two nominally flat and parallel glass sheets (P1, P2) and a collimating lens can be used to demonstrate the principle of the approach. Interference takes place between the wavefronts reflected from the rear surface of P1 and the front surface of P2. The combined wavefronts are re-focused by the collimating lens and directed towards the CCD camera 2 via the beam-splitting glass plate P3. All the components are uncoated; hence the intensity of the emergent captured light is low, restricted by the combined reflections of approximately 4% at each interface of P1, P2 and P3. In addition, the contrast of the interferograms and the subsequent moiré image were reduced because of the limited coherence length of the He—Ne laser and the dissimilar optical paths. A gap of approximately 100 mm between P1 and P2 caused a marginal degradation of fringe contrast.

The dimensions of the collimating lens define the optical aperture of the interferometer. Trials with a 160 mm diameter plano-convex singlet lens, with a focal length of 750 mm indicated that the initial fringe pattern showed of the order of 100 highly distorted fringes resulting from the unflatness of the plates and the spherical aberration in the lens. Consequently, there was no need to introduce additional tilt fringes before applying moiré subtraction. Results on introducing tilts to P2 as well as monitoring butane gas flow were similar to those shown in FIGS. 3(a) and (b) and extended to almost the whole 200 mm aperture.

A plastic Fresnel lens, removed from an overhead projector, was used an an alternative collimating lens. These are injection moulded and not intended for imaging purposes, but as light gatherers over extreme optical apertures. The lens examined consisted of two inwardly facing Fresnel lenses 280 mm square and having an effective focal length of approximately 200 mm. (f/0.7). It was not possible to image the interferogram because of the large field angle. The double lens was separated and one was mounted, lens side inwards on a glass plate using silicone rubber. By filling the gap with water, the effective focal length was increased to approximately 800 mm.

Figure 6:
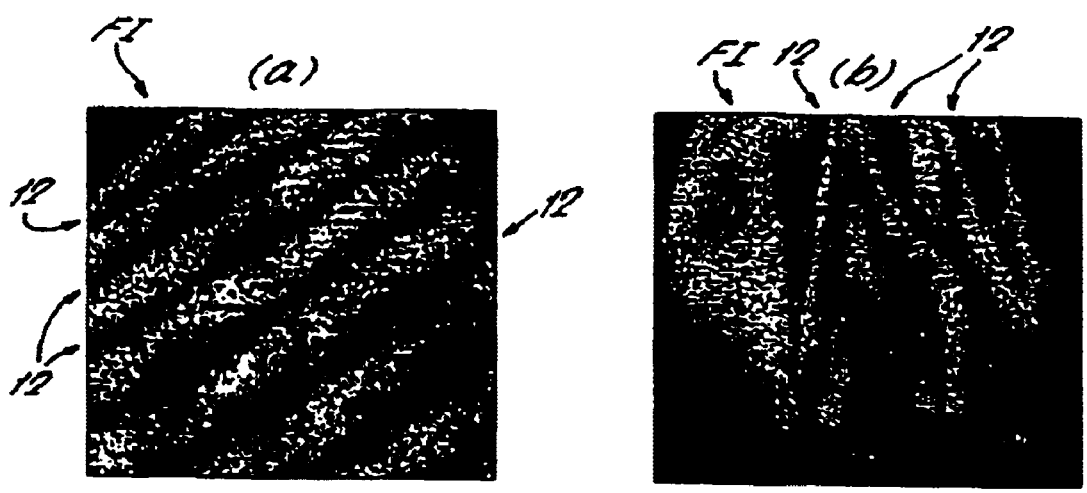
FIG. 6a shows a DMS interferogram from the Fresnel lens interferometer of FIG. 5 with a tilt of plate P2.
FIG. 6b shows a DMS interferogram from the Fresnel lens interferometer of FIG. 5 of hot air flow above a soldering iron.

Provisional results showed that the imaging was not symmetric and poorly resolved, but acceptable fringe contrast and definition was achieved over an aperture of 220 mm diameter (FIG. 6). Although visible in the image, the circular structure of the Fresnel lens was not seriously conspicuous.

The trials indicate that it is feasible to use a Fresnel lens in embodiments of the present invention, but only where poor image quality can be tolerated.

In conclusion digital moiré subtraction allows the accurate measurement of a variety of optical components, mechanical and thermal behaviour and other parameters using optical interferometers which possess inherently poor optical quality. The method also offers the possibility of constructing very large aperture interferometers from inexpensive and imperfect optical components.

Each feature described in this specification (including the claims) may be incorporated in the present invention independently of other described features.

What is claimed is:

1. A measurement method comprising the steps of:
   arranging an interferometer to form a non-speckle first interference fringe pattern comprising at least ten interference fringes;
   recording an image of said first interference fringe pattern;
   perturbing an optical path in the interferometer to form a non-speckle second interference fringe pattern comprising at least ten interference fringes; and
   combining an image of said second interference fringe pattern with the recorded image of the first interference fringe pattern to produce a further image comprising a moiré fringe pattern arising from a difference or differences between the first and second interference fringe patterns.

2. A measurement method in accordance with claim 1, wherein said arranging step includes the step of tilting a reflecting surface of the interferometer to increase the number of interference fringes in the first interference fringe pattern.

3. A measurement method in accordance with claim 1 wherein said first interference pattern comprises at least fifty interference fringes.

4. A measurement method in accordance with claim 1 wherein said second interference fringe pattern comprises a larger number of interference fringes than the first interference fringe pattern.

5. A measurement method in accordance with claim 1, wherein the step of perturbing includes the step of inserting a transparent object in the optical path.

6. A measurement method in accordance with claim 1, wherein the step of perturbing includes at least one of the steps of distorting, rotating and translating a reflecting surface in the optical path.

7. A measurement method in accordance with claim 1, wherein the step of perturbing includes at least one of the steps of distorting, rotating and translating a transparent object in the optical path.

8. A measurement method in accordance with claim 1 wherein the step of perturbing includes the step of replacing a reference object with a test object.

9. A measurement method in accordance with claim 1 wherein the step of perturbing includes at least one of the steps of disturbing a gas, and disturbing a gas flow in the optical path.

10. A measurement method in accordance with claim 1, wherein said image of the second interference fringe pattern is a recorded image.

11. A measurement method in accordance with claim 1 wherein at least one of the recorded image of the first interference fringe pattern and the image of the second interference pattern is an image selected from a recorded sequence of images of the interference fringe pattern formed by the interferometer.

12. A measurement method in accordance with claim 1, wherein the recorded image of the first interference fringe pattern and the image of the second interference fringe pattern are digital images.

13. A measurement method in accordance with claim 12 wherein the step of combining includes the step of subtracting one of the digital images from the other.

14. A measurement method in accordance with claim 13, wherein the step of combining includes the step of converting negative values obtained in the subtracting step to positive values.

15. A measurement method in accordance with claim 12, wherein the digital images are images captured by a CCD camera.

16. A measurement method in accordance with claim 1, further comprising the steps of:
   arranging the interferometer to form a third interference fringe pattern;
   recording an image of the third interference fringe pattern;
   arranging the interferometer to form a fourth interference fringe pattern;
   recording an image of the fourth interference fringe pattern, wherein the first, third and fourth interference fringe patterns are phase shifted from each other by predetermined amounts; and
   combining the image of the second interference fringe pattern with each of the recorded images of the first, third and fourth interference fringe patterns to produce respective said further images; and
   processing the further images to produce a phase map of the perturbation of the optical path.

17. A measurement method in accordance with claim 16 wherein said images of the third and fourth interference fringe patterns are digital images.

18. A measurement method comprising the steps of:
   arranging an interferometer to form a non-speckle interference fringe pattern comprising at least ten interference fringes;
   perturbing an optical path in the interferometer to alter the interference fringe pattern;
   combining a recorded image of the non-speckle interference fringe pattern with each one of a sequence of images of the interference fringe pattern at respective different times to produce a sequence of respective further images each comprising a moiré fringe pattern arising from a difference between the recorded image and the respective one of the sequence of images.

19. A measurement method in accordance with claim 18 wherein the recorded image and the sequential images are digital images.

20. A measurement method in accordance with claim 19 wherein the step of combining includes the step of subtracting one digital image from another.

21. A measurement method in accordance with claim 20, further comprising the step of displaying the sequence of respective further images.

22. A measurement method in accordance with claim 21, wherein the sequence of images of the interference fringe pattern is captured by a camera at a rate, and the sequence of respective further images is displayed at or substantially at said rate.

23. Measurement apparatus comprising:
   an interferometer arranged to form non-speckle interference fringe patterns comprising at least ten interference fringes;
   a camera arranged to capture images of the interference fringe patterns;
   an image store arranged to store an image of the interference fringe pattern captured by the camera at a selected time;
   an image processor arranged to combine the stored image with an image of the interference fringe pattern captured by the camera at a different time to produce a further image comprising a moiré fringe pattern arising from a difference or differences between the interference fringe patterns at the selected and said different time.

24. Measurement apparatus in accordance with claim 23 wherein the interferometer is arranged to form interference fringe patterns comprising at least fifty interference fringes.

25. Measurement apparatus in accordance with claim 23, wherein said images are digital images.

26. Measurement apparatus in accordance with claim 25, wherein the image processor is arranged to produce the further image by a process including at least the subtraction of one of the digital images from the other.

27. Measurement apparatus in accordance with claim 26 wherein the image processor is arranged to produce the further image by a process including the conversion of negative values obtained in the subtraction to positive values.

28. Measurement apparatus in accordance with claim 23, wherein the interferometer includes means for phase shifting the interference fringe patterns by predetermined amounts, the image store is arranged to store images of the interference fringe patterns captured by the camera at at least three different selected times, the image processor is arranged to combine each stored image with said image captured at a different time to produce a respective further image comprising a respective moiré fringe pattern, and the image processor is further arranged to process the further images to produce a phase map.

29. Measurement apparatus in accordance with claim 23 wherein the camera is arranged to output a sequence of said captured images, the image processor is arranged to combine the or one of the stored images with each one of the sequence of captured images in turn to produce a respective said further image, the apparatus further comprising at least one of:

a display for displaying the sequence of further images; and means for storing the sequence of further images.

30. Measurement apparatus in accordance with claim 29, wherein the camera is arranged to output the sequence of captured, images at a rate, and the apparatus is further arranged to display the sequence of further images at said rate.

31. Measurement apparatus in accordance with claim 23, further comprising an image recorder for recording the images captured by the camera, and an image selector for selecting one of the recorded images as an image to be stored in the image store or an image to be combined with a stored image.

32. Measurement apparatus in accordance with claim 23 wherein the camera is a CCD camera.

33. Measurement apparatus in accordance with claim 23, wherein the interferometer has an aperture of at least 10 cm.

* * * * *